United States Patent [19]

Willhoft

[11] 4,073,872

[45] Feb. 14, 1978

[54] PROCESS FOR PRODUCING A PRODUCT CONTAINING ALUMINUM AND CHLORINE

[76] Inventor: Edward Max Adolf Willhoft, 6 Rosebery Road, Langley Vale, Epsom Downs, Surrey, England

[21] Appl. No.: 680,860

[22] Filed: Apr. 27, 1976

[51] Int. Cl.² .......................... C01F 7/56; C01F 7/60; C01F 7/00

[52] U.S. Cl. .................................. 423/496; 423/136; 423/137; 423/462; 423/463; 423/472

[58] Field of Search ............... 423/136, 495, 496, 137, 423/462, 463, 472

[56] References Cited

U.S. PATENT DOCUMENTS

| | | | |
|---|---|---|---|
| 1,508,451 | 9/1924 | Gray et al. | 423/136 |
| 1,549,766 | 8/1925 | Hall | 423/136 |
| 1,713,968 | 5/1929 | Lea | 423/136 |
| 1,814,397 | 7/1931 | McAfee | 423/136 |
| 1,865,008 | 6/1932 | Holm | 423/136 |
| 2,832,668 | 4/1958 | Culberson et al. | 423/136 |
| 3,937,786 | 2/1976 | Nemecz et al. | 423/136 |
| 3,950,485 | 4/1976 | Nemecz et al. | 423/496 X |

*Primary Examiner*—Edward Stern
*Attorney, Agent, or Firm*—Lewis H. Eslinger

[57] ABSTRACT

The invention provides a process for recovering aluminum values from aluminum-containing minerals, such as oxides of aluminum and aluminosilicates.

The process involves heating an intimate mixture of an aluminum-containing mineral and a solid carbonisable organic material, preferably a fibrous cellulosic material, so as to carbonize the organic material, and chlorinating the solid residue from the carbonization step. The solid residue contains carbon in very finely divided form distributed throughout the aluminum-containing mineral. The surface area and reactivity of this carbon is much higher than that of powdered coal and the chlorination reaction thus takes place in a most efficient manner.

3 Claims, No Drawings

PROCESS FOR PRODUCING A PRODUCT CONTAINING ALUMINUM AND CHLORINE

This invention relates to a process for recovering aluminum values from aluminum-containing minerals.

Aluminum is widely distributed about the surface of the earth, mainly in the form of clays from which it has hitherto not proved economic to extract the metal or its compounds. It is known to form aluminum chloride by sintering a mixture of bauxite, which is a hydrated oxide of aluminum, and powdered coal at a high temperature and then passing gaseous chlorine over the mixture. This process has been applied industrially, but is limited by the relatively low yield of aluminum chloride and the high cost of the starting materials.

The present invention enables aluminum values to be recovered from aluminum-containing minerals, and in particular from materials containing minerals which have hitherto been regarded as industrial waste products.

The present invention provides a process for recovering aluminum values from an aluminum-containing mineral, which process comprises heating and intimate mixture of an aluminum-containing mineral and a solid carbonisable organic material so as to carbonise the organic material, chlorinating the solid residue from the carbonisation step, and recovering a chlorination product containing aluminum and chlorine.

The invention may be applied to a wide range of aluminum-containing minerals, and especially those in which aluminum is in combination with oxygen and/or silica. Thus the invention may be applied to oxides of aluminum, for example hydrated oxides such as bauxite and aluminosilicates, for example aluminum-containing glasses and clay minerals such as kaolinite (sometimes referred to as china clay), montmorillonite, bentonite, halloysite, allophane and mica. The aluminum-containing mineral preferably is finely divided in order to make possible intimate mixing with the carbonisable organic material, particle sizes down to 20 microns especially down to 10 microns, are preferred. The mineral can, if desired, be calcined before the carbonisation step.

The organic material should be one that can be carbonised without complete volatilisation although some production of volatile material can be tolerated and may indeed be desirable in that it can help to distribute fine particles of carbon throughout the aluminum-containing mineral. The carbonisable organic material preferably is in finely divided, especially fibrous, form so that, upon carbonisation, a very finely divided form of carbon is obtained in intimate contact with the aluminum-containing mineral. Among the wide range of suitable organic materials there may be especially mentioned cellulosic materials, such as paper, wood flour, sawdust, bark, wood knots, peat, bagasse, straw and waste materials from many food manufacturing processes, for example coffee and tea wastes. It is also possible to use various synthetic polymeric materials, such as waste plastics (e.g. polyamides, polyethylene, polypropylene and polyvinylchloride).

The process of the invention is particularly suitable for, and will subsequently be illustrated in connection with, the treatment of paper sludge. Paper sludge is the effluent from paper making processes and consists of a dilute slurry of organic fibres of vegetable origin, usually cellulosic fibres, and of non-fibrous fillers or loading agents. The organic fibres in the sludge are extremely fine, since they have passed through the paper-making wire, and upon carbonisation provide very finely divided carbon. The fillers or loading agents can contain a high proportion of aluminum-containing minerals, for example clays such as bentonite and china clay. Paper sludge thus can contain a carbonisable organic material, in the form of organic fibres, and also an aluminum-containing mineral, and a paper sludge containing both may be used directly in the process of the invention. Additional carbonisable material, such as shredded waste paper, and/or an aluminum-containing mineral may be added to a paper sludge and incorporated therein by simple mixing techniques. Paper sludge can contain as much as 10% by weight of solid material, but usually the proportion is typically around 500 ppm to 100 ppm in the effluent as it leaves the paper mill. The sludge is preferably allowed to settle, concentrated, for example to 20 to 25% by weight solids content, and then dried to 90 to 95% by weight solids content for use in the process of the present invention.

In the next stage of the process, the paper sludge or other mixture of aluminum-containing mineral and carbonisable organic material is heated to carbonise the organic material present. The mixture can be shaped, for example by pelletising or briquetting, before the carbonisation. The carbonisation can be carried out entirely in a non-oxidising atmosphere which may for example be nitrogen or carbon dioxide or it is possible to supply a limited amount of oxygen or gas containing molecular oxygen in order to burn some of the organic material and supply heat for the carbonisation reaction. Clearly in the latter case it is necessary to use sufficient organic material to allow for that which is burnt while leaving a suitable amount to undergo carbonisation. The temperature of carbonisation will of course depend upon the organic material being used, but is usually in the range of from 500° C to 1000° C, and preferably from 750° C to 900° C. The organic material is converted upon carbonisation to finely divided carbon which is distributed throughout the aluminum-containing mineral and provides for a high interfacial area of contact between the aluminum-containing mineral and the carbon. The surface area and reactivity of this carbon is many times greater than that of the powdered coal which has hitherto been used.

The solid residue from the carbonisation reaction is then chlorinated, for example by passing chlorine gas (which need not be pure and can contain, for example, hydrogen chloride, hydrocarbons and chlorinated hydrocarbons) through the carbonised material at an elevated temperature. The temperature of reaction may be up to about 1500° C but is preferably slightly lower than the carbonisation temperature, for example in the range of from 500° C to 800° C. The main products of the chlorination reaction are gaseous at the reaction temperature and consist of the product containing aluminum and chlorine, oxides of carbon and phosgene together with unreacted chlorine, and minor amounts of impurities including silicon tetrachloride and ferric chloride. The chlorination products can differ at different chlorination temperatures for example greater amounts of silicon tetrachloride are produced at the higher chlorination temperatures. The chlorination reaction may be carried out in any suitable apparatus, for example a rotary kiln, fluidised bed, or indirect-fired system.

The chemical form of the chlorination product containing aluminum and chlorine can depend upon the conditions of the chlorination reaction. The most usual chlorination product is aluminum chloride, but other products could result, such as aluminum oxychloride, aluminum hydroxychloride and mixed chlorides such as sodium aluminum chloride or potassium aluminum chloride.

The reactions taking place during the chlorination step involve simultaneous oxidation and reduction. Two possible reaction schemes when using an aluminum-containing mineral such as a clay and producing aluminum chloride can be summarised as follows:

$$Al_2O_3 + 3C + 3Cl_2 = 2AlCl_3 + 3CO \qquad (A)$$

and $$2Al_2O_3 + 3C + 6Cl_2 = 4AlCl_3 + 3CO_2 \qquad (B)$$

The first of these (A) can be termed the "carbon monoxide" route, while the second (B) can be termed the "carbon dioxide" route. Which route is the better to be followed will depend upon the circumstances of a given situation since much can depend upon choice and form of starting materials and upon energy requirements. The choice of route will affect the theoretical quantities of starting materials required for stoichiometric conversion of the aluminum values in the aluminum-containing mineral into aluminum chloride. In calculating the relative proportions of the starting materials account must also be taken of the fact that the organic material usually suffers a large weight loss upon carbonisation, whereas the aluminum-containing mineral is comparatively unaffected. For example, cellulose suffers an approximately 5-fold reduction in weight upon carbonisation. When taking these factors into consideration it is calculated that the theoretical quantities (parts by weight) of the starting materials and product for the different routes are as follows when using cellulose and china clay:

|  | Cellulose (dry weight) | China Clay | Aluminum Chloride |
|---|---|---|---|
| Route (A) | 1 | 1.45 | 0.89 |
| Route (B) | 1 | 2.9 | 1.79 |

It is possible to employ an excess of the organic material over the stoichiometric requirements. When this is done the excess carbon remaining after carbonisation and chlorination remains in the solid residue of the chlorination reaction and is in highly active form, having become activated during the chlorination and also by moisture (either moisture introduced by recycling products of combustion or carbonisation, or bound moisture released by a clay during the final stages of carbonisation). Such active carbon may usefully be recovered.

Aluminum chloride may be separated from other products of the chlorination reaction by dissolving in ethanol, passing the resultant solution through a bed of active charcoal and recovering the purified aluminum chloride from the ethanolic solution. Alternatively it may be separated from the other products by fractional distillation of sublimation of the condensed vapours emerging from the reaction zone.

Aluminum chloride by the process of the present invention has a variety of uses as a catalyst in organic chemistry, particularly in polymerisation reactions and organic syntheses. It is also useful intermediate in the production of aluminum, for example by the TOTH and ALCOA processes, and may have pharmaceutical applications.

The solid residue from the chlorination reaction is depleted in aluminum ions and may therefore find application as a solid adsorbent and as an ion exchange material. It might also find use as an ingredient of cement. Active carbon contained therein can be separately recovered if desired.

The invention is illustrated by the following Example:

EXAMPLE

Paper sludge containing chain clay and cellulose fibres in a weight ratio of 1:5 is dried to a moisture content of about 5% by weight. The dried paper sludge is then fed into a tubular heating chamber formed from alumina and situated inside an electrically heated furnace. The tube may be coated with metal to reduce oxygen diffusion into the reaction zone or could be constructed of quartz or graphite. After introduction of the dried material, one end of the tube is fitted with an inlet for gas introduction and the other end with an outlet for the products of the carbonisation and chlorination reactions. The temperature of the furnace is gradually raised to 800° C and maintained at 800° C for 1 hour, while passing a stream of nitrogen through the tube. Volatile material produced by the carbonisation of the cellulose fibres is condensed and discarded. The temperature is then gradually lowered to 550° C and chlorine passed through the tube at approximately 1 liter per minute until chlorination is complete. The rate of reaction may be controlled by varying the temperature. The volatile products of the chlorination reaction are bubbled through ethanol and passed through a bed of active carbon. Finally the ethanol is separated from the purified aluminum chloride by fractional distillation.

I claim:

1. In a process for preparing a product containing aluminum and chlorine by chlorinating a mixture of an aluminum-containing mineral and carbon and recovering aluminum chloride, the improvement wherein a dried paper sludge, said dried paper sludge containing a carbonizable organic material in the form of organic fibres in intimate association with an aluminum-containing mineral selected from the group consisting of an oxide of aluminum and an aluminosilicate in finely divided form, is heated to a temperature of 500° to 1000° C to carbonize the organic fibers, the solid residue from the carbonization step is chlorinated, and a product containing aluminum and chlorine is recovered.

2. A process according to claim 1 wherein the aluminum-containing mineral is selected from bauxite, kaolinite and mica.

3. A process according to claim 1 wherein the amount of carbonisable organic material is in excess of the amount required to provide for stoichiometric conversion of the aluminum values in the aluminum-containing mineral to a product containing aluminum and chlorine after the carbonisation and chlorination reactions.

* * * * *